United States Patent
Pei et al.

(10) Patent No.: US 11,635,235 B2
(45) Date of Patent: Apr. 25, 2023

(54) ELECTROSTATICALLY ACTUATED DEVICE

(71) Applicant: The Regents of the University of California, Oakland, CA (US)

(72) Inventors: Qibing Pei, Los Angeles, CA (US); Rujun Ma, Los Angeles, CA (US); Ziyang Zhang, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 120 days.

(21) Appl. No.: 17/040,635

(22) PCT Filed: Mar. 25, 2019

(86) PCT No.: PCT/US2019/023827
§ 371 (c)(1),
(2) Date: Sep. 23, 2020

(87) PCT Pub. No.: WO2019/183618
PCT Pub. Date: Sep. 26, 2019

(65) Prior Publication Data
US 2021/0025626 A1    Jan. 28, 2021

Related U.S. Application Data

(60) Provisional application No. 62/647,037, filed on Mar. 23, 2018.

(51) Int. Cl.
*F25B 21/04*    (2006.01)
(52) U.S. Cl.
CPC ........ *F25B 21/04* (2013.01); *F25B 2321/001* (2013.01)
(58) Field of Classification Search
CPC .... Y02B 30/00; F25B 21/04; F25B 2321/001; F25B 21/00
See application file for complete search history.

(56) References Cited

U.S. PATENT DOCUMENTS

| | | | |
|---|---|---|---|
| 6,066,911 A | 5/2000 | Lindemann et al. |
| 7,787,254 B2 | 8/2010 | Clayton et al. |
| 8,695,353 B2 | 4/2014 | Casasanta |
| 9,461,564 B2 | 10/2016 | Skotnicki |
| (Continued) | | | |

FOREIGN PATENT DOCUMENTS

WO    2011075335    6/2011

OTHER PUBLICATIONS

PCT International Search Report & Written Opinion dated Jun. 14, 2019 for PCT Appln. No. PCT/US2019/023827.

(Continued)

*Primary Examiner* — Ana M Vazquez
(74) *Attorney, Agent, or Firm* — Gates & Cooper LLP

(57) ABSTRACT

A device including a bottom electrode on a substrate and a top electrode on a substrate separated by a fixed distance from each other. Semi-insulator layers with proper electrical conductivity are attached to the bottom and top electrodes. Disposed between the substrates is a flexible S-shaped polymer stack having electrode layers with one end of the stack attached to the top substrate and the other end in contact with the bottom substrate. When a voltage is applied between the stack and the electrode layer on the bottom substrate, the stack is induced by electrostatic force to deflect in a rolling wave-like motion. While the voltage applied between the stack and bottom electrode is turned off, the static charges on the semi-insulator layer can move away quickly due to the proper electrical conductivity of the semi-insulator layer.

20 Claims, 5 Drawing Sheets

(56) References Cited

U.S. PATENT DOCUMENTS

| | | | |
|---|---|---|---|
| 9,508,913 | B2 | 11/2016 | Kruglick |
| 10,125,758 | B2 | 11/2018 | Ducharme |
| 2005/0029498 | A1 | 2/2005 | Elkovitch et al. |
| 2011/0146308 | A1 | 6/2011 | Casasanta |
| 2013/0319012 | A1* | 12/2013 | Kuo ................. F25B 21/00 62/3.1 |
| 2014/0034529 | A1 | 2/2014 | McGuire et al. |
| 2015/0208498 | A1 | 7/2015 | Poon |
| 2017/0030529 | A1 | 2/2017 | Bergmann et al. |
| 2019/0003747 | A1* | 1/2019 | Walker .............. F25B 21/00 |
| 2021/0071917 | A1 | 3/2021 | Pei et al. |

OTHER PUBLICATIONS

Chow et al., "Effects of antistatic agent on the mechanical, morphological and antistatic properties of polypropylene/organo-montmo-rillonite nanocomposites". eXPRESS Polymer Letters vol. 3, No. 2 (2009) 116-125.

Kwon et al., "Comparison of the Properties of Waterborne Polyurethane/Multiwalled Carbon Nanotube and Acid-Treated Multiwalled Carbon NanotubeComposites Prepared by In Situ Polymerization". Department of Textile Engineering, Pusan National University, Busan 609-735, Korea, 2005, pp. 3973-3985.

Li et al., "Microstructure of carbon nanotubes/PET conductive composites fibers and their properties". Composites Science and Technology 66 (2006) 1022-1029.

PCT International Search Report & Written Opinion dated Oct. 17, 2018, International Application No. PCT/US18/31410.

Non-Final Office Action dated Aug. 2, 2021 for U.S. Appl. No. 16/610,838.

Final Office Action dated Dec. 21, 2021 for U.S. Appl. No. 16/610,838.

* cited by examiner

ELECTROSTATICALLY ACTUATED DEVICE

CROSS REFERENCE TO RELATED APPLICATIONS

This application claims the benefit under 35 U.S.C. Section 119(e) of and commonly-assigned U.S. Provisional Patent Application Ser. No. 62/647,037, filed on Mar. 23, 2018, by Qibing Pei, Rujun Ma, and Ziyang Zhang entitled "ELECTROSTATICALLY ACTUATED DEVICE", (2018-449-1); which application is incorporated by reference herein.

TECHNICAL FIELD

The present invention relates to electrostatically actuated device structures, e.g., with high operation frequency.

BACKGROUND OF THE INVENTION

Actuated devices have led to the development of various techniques and structures for providing the force necessary to cause the desired motion. For example, microcantilevers have been used to apply rotational mechanical force to rotate micromachined springs and gears. Electromagnetic fields have been used to drive micromotors. Piezoelectric forces have also been successfully used to controllably move micromachined structures. Controlled thermal expansion of actuators or other microelectromechanical (MEMS) components have been used to create forces for driving microdevices.

Electrostatic forces have also been used to move structures. Electrostatic forces due to the electric field between electrical charges can generate relatively large forces given the small electrode separations in electrostatically actuated devices. These forces are readily controlled by applying a difference in voltage between electrodes, resulting in relatively large amounts of motion. Electrostatically actuated devices are being developed for a wide variety of applications because they provide the advantages of low cost, high reliability and extremely small size. Traditional electrostatic devices are constructed from laminated films cut from plastic or mylar materials. A flexible electrode is attached to the laminated film and another electrode is affixed to a base structure. Electrically energizing the respective electrodes creates an electrostatic force attracting the electrodes to each other or repelling them from each other.

Classic electrostatically actuated systems that use two smooth surfaces, where the diaphragm forms an "S" shape, are designed to make the diaphragm smoothly move from one position to the next. The dielectric layer is made from suitable insulator, such as plastic, polymer, oxide and so on. However, the charges trapped in the bulk and/or on the surfaces can create an electrostatic sticking force that can prevent the device from working at all. This charge trapping, or residual static charges that cannot be rapidly removed, is problematic for rapid, cyclic actuation. Therefore, there is a need to develop improved electrostatic actuated devices and techniques for reversible high frequency operation. The present disclosure satisfies this need.

SUMMARY OF THE INVENTION

To overcome the limitations described above, and to overcome other limitations that will become apparent upon reading and understanding the present specification, the present disclosure describes an actuator device driven by electrostatic forces, comprising a substrate defining a smooth surface; a substrate electrode forming a layer on the substrate; and a flexible membrane overlaying the substrate electrode. The flexible membrane includes a flexible electrode layer, a fixed portion attached to an underlying surface of the substrate, and a movable portion that is movable with respect to the substrate electrode. The device further includes a semi-insulator separating the substrate electrode from the flexible electrode and having a bulk electrical resistivity greater than $10^7$ Ωcm but less than $10^{13}$ Ωcm.

In an embodiment of the invention, the device further comprises a bottom electrode and a top electrode separated by a fixed distance from each other and the semi-insulator layers with proper electrical conductivity attached to the bottom and top electrodes. In one or more further examples, the flexible membrane is disposed between the substrates and is a flexible S-shaped polymer stack having electrode layers with one end of the stack attached to the top substrate and the other end in contact with the bottom substrate.

In one or more examples, such an electrostatically actuated device has relatively low fabrication costs, and consumes relatively low power, and is suitable for a wide variety of applications including, but not limited to, microelectromechanical (MEMS) devices, low power and compact solid-state cooling device applications, and automotive applications.

The present disclosure further describes an electrostatically actuated electrocaloric cooling device, comprising a first substrate defining a smooth surface; a first substrate electrode forming a layer on the smooth surface of the first substrate; and a two-layer flexible electrocaloric polymer stack overlaying the first substrate electrode. The stack includes one or more (e.g., three) flexible electrode layers, a fixed portion attached to an underlying surface of the first substrate, and a movable portion that is movable with respect to the first substrate electrode. The device further includes a second substrate defining a smooth surface; and a second substrate electrode forming a layer on the smooth surface of the second substrate. The device further includes a first semi-insulator separating the first substrate electrode from the stack (or between the first substrate electrode and the stack) and having a bulk electrical resistivity greater than $10^7$ Ωcm but less than $10^{13}$ Ωcm. The device further includes a second semi-insulator separating the second substrate electrode from the stack (or between the second substrate electrode and the stack) and having a bulk electrical resistivity greater than $10^7$ Ωcm but less than $10^{13}$ Ωcm.

In the various embodiments, the movable portion defines a generally constant air gap between the second substrate electrode and the flexible electrode layer.

In various embodiments, the movable portion defines a generally decreasing air gap between the first substrate electrode and the flexible electrode layer.

In various embodiments, the movable portion defines a generally decreasing air gap between the second substrate electrode and the flexible electrode layer.

In various embodiments, the flexible membrane defines a contact zone where an air gap decreases to zero at a location between the first substrate and the flexible electrode layer.

In various embodiments, the flexible membrane defines a contact zone where an air gap decreases to zero at a location between the second substrate and the flexible electrode layer.

In various embodiments, an air gap between the flexible membrane and the first or second substrate generally maintains shape with or without the generation of an electrostatic force between the flexible electrode layer and the first substrate electrode or the second substrate electrode.

In various embodiments, the first substrate electrode and the second substrate electrodes underlie substantially an entire area of the movable portion of the flexible membrane.

In various embodiments, the first and second semi-insulators are attached to, and overlie, the first substrate electrode and the second substrate electrode layer.

In various embodiments, the surface areas of the first substrate electrode and the second substrate electrodes each comprise generally the same surface area as the flexible electrode layer.

In various embodiments, the shape of the first substrate electrode and the second substrate electrode is generally the same as the shape of the flexible electrode layer.

In various embodiments, the flexible membrane has a generally rectangular shape.

In the various embodiments, the movable portion defines a generally constant air gap between the second substrate electrode and the flexible membrane.

In various embodiments, the movable portion defines a generally decreasing air gap between the first substrate electrode and the flexible membrane.

In various embodiments, the movable portion defines a generally decreasing air gap between the second substrate electrode and the flexible membrane electrode.

In various embodiments, the flexible membrane defines a contact zone where an air gap decreases to zero at a location between the first substrate and the flexible membrane.

In various embodiments, the flexible membrane defines a contact zone where an air gap decreases to zero at a location between the second substrate and the flexible membrane.

In various embodiments, an air gap between the flexible membrane and the first or second substrate generally maintains shape with or without the generation of an electrostatic force between the flexible electrode layer and the first substrate electrode or the second substrate electrode.

In various embodiments, the flexible membrane is generally curled away from the underlying first or second substrate when application of an electric field deflects the flexible membrane in a in a rolling wave-like motion moving from one of the fixed portions to the other of the fixed portions.

In various embodiments, the first substrate electrode and the second substrate electrodes underlie substantially an entire area of the movable portion of the flexible membrane.

In various embodiments, the first and second semi-insulators are attached to, and overlie, the first substrate electrode and the second substrate electrode layer.

In various embodiments, the surface areas of the first substrate electrode and the second substrate electrodes each comprise generally the same surface area as the flexible electrode layer.

In various embodiments, the shape of the first substrate electrode and the second substrate electrode is generally the same as the shape of the flexible electrode layer.

In various embodiments, the flexible membrane has a generally rectangular shape.

In various embodiments, the flexible membrane is generally curled away from the underlying first substrate from the fixed portion to the second fixed portion.

In various embodiments, the first and second semi-insulators have or are layers having a thickness of 1-100 μm or 2-100 μm.

In various embodiments, first and second examples are an electro-thermally responsive device, where the flexible membrane transduces between electrical energy and heat energy.

In various embodiments of the first and second examples, the flexible membrane is an electromechanically responsive membrane comprising an even number of stacked electromechanically responsive layers and the flexible electrode layer between adjacent electromechanically responsive layers.

In various embodiments, the electrostatically actuated electrocaloric cooling device includes the flexible electrocaloric polymer stack having a thickness of 10-100 μm or 1-50 μm.

In various examples, the semi-insulator is a polymer-conductor composite comprising the polymer of polyimide, polyurethane, polyacrylate, polyvinylidene fluoride or polydimethylsiloxane and conductor of graphite powder, carbon nanotube, graphene, metal nanowire, metal nanoparticle, or conductive polymer.

BRIEF DESCRIPTION OF THE DRAWINGS

Referring now to the drawings in which like reference numbers represent corresponding parts throughout.

DETAILED DESCRIPTION OF THE INVENTION

Technical Description

In the detailed description of the invention, references may be made to the accompanying drawings which form a part hereof, and in which is shown by way of illustration specific embodiments in which the invention may be practiced. It is to be understood that other embodiments may be utilized and structural changes may be made without departing from the scope of the present invention. A number of different publications are also referenced herein as indicated throughout the specification. A list of these different publications can be found below in the section entitled "REFERENCES". All publications, patents, and patent applications cited herein are hereby incorporated by reference in their entirety for all purposes.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are generally well understood and commonly employed using conventional methodology by those skilled in the art. As appropriate, procedures involving the use of commercially available kits and reagents are generally carried out in accordance with manufacturer defined protocols and/or parameters unless otherwise noted.

First Example Structure

Figure 1:
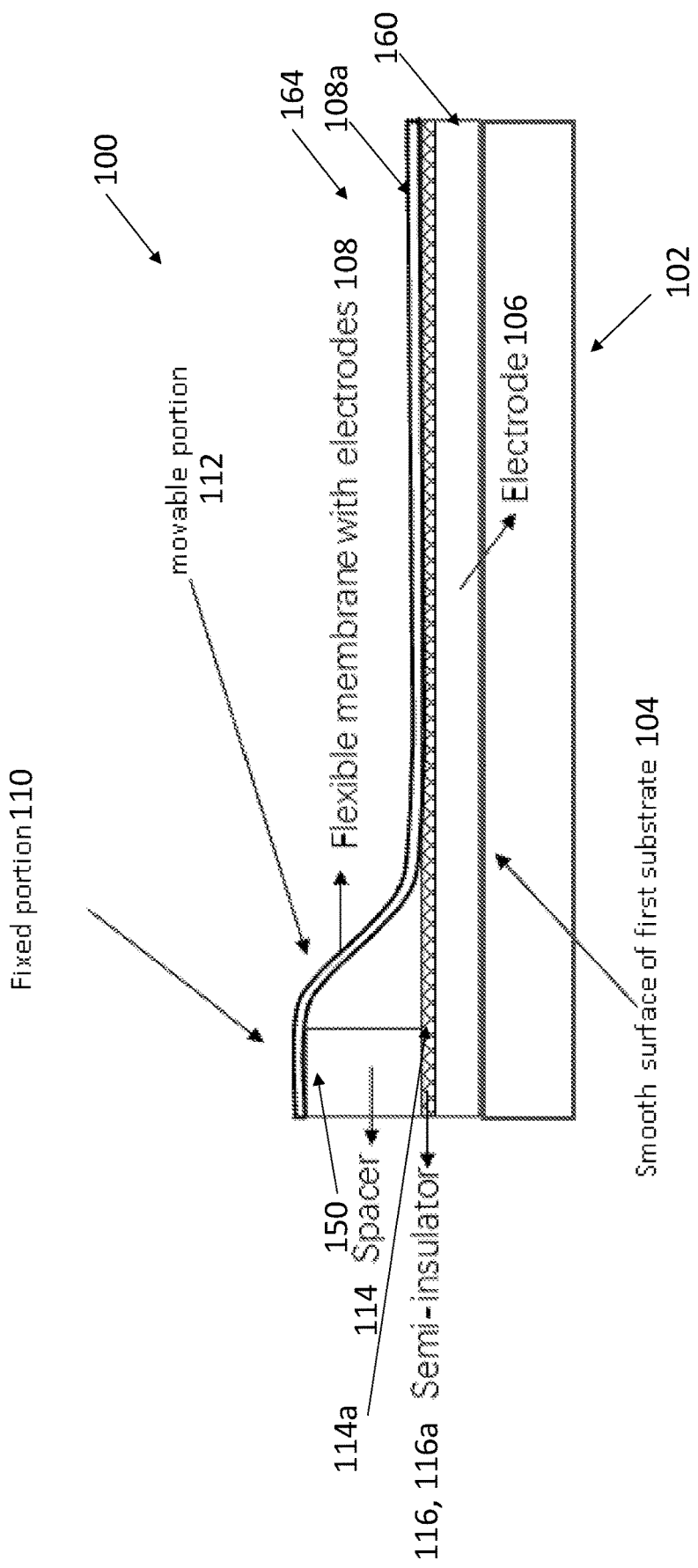
FIG. 1. The cross-sectional view of an embodiment of the present invention.

FIG. 1 illustrates an actuator device 100 driven by electrostatic forces, comprising a substrate 102 including and/or defining a smooth surface 104; a layer comprising a substrate electrode 106 on the smooth surface of the substrate; and a flexible membrane 108 overlaying the substrate electrode. The flexible membrane 108 includes a flexible electrode 108c (or flexible electrode layer 108a); a fixed portion 110; and a movable portion 112. The fixed portion is attached to an underlying surface 114a (e.g., a spacer 114) of the substrate or to a spacer 114 between the substrate 102 and the fixed portion 110. The movable portion 112 is movable with respect to the substrate electrode 106. FIG. 1 further illustrates a semi-insulator 116 (or layer 116a comprising a semi-insulator) separating the substrate electrode 106 from the flexible electrode or flexible electrode layer 108a. In one or more examples, the semi-insulator 116 is on or above the substrate electrode 106. In one or more examples, the semi-insulator 116 has a bulk electrical resistivity greater than $10^7$ Ωcm (ohm-centimeter) but less than $10^{13}$ Ωcm.

Second Example Structure

Figure 2:
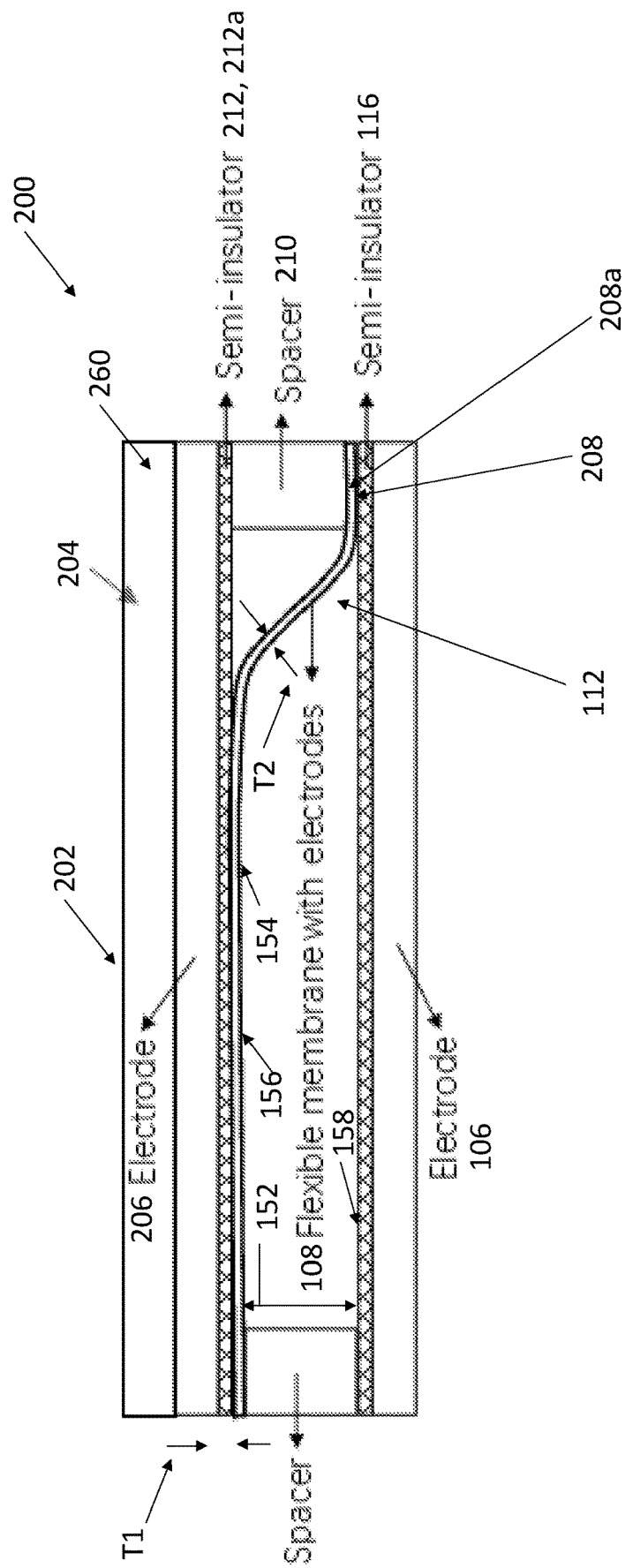
FIG. 2. The cross-sectional view of an alternate embodiment of the present invention.

FIG. 2 illustrates an actuator device 200 driven by electrostatic forces having the structure of FIG. 2 but also further comprising a second substrate 202 (having and/or defining a second smooth surface 204); and a second layer comprising a second substrate electrode 206 on the second smooth surface of the second substrate, so that the flexible membrane 108 overlays the first substrate electrode 106 or the second substrate electrode 206 depending on the voltage differential being applied between the flexible electrode and the flexible electrode layer and the substrate electrodes. FIG. 2 further illustrates the flexible membrane further includes a second fixed portion 208 (attached to an underlying surface 208a of the second substrate or to a second spacer 210 between the second substrate and the second fixed portion). The movable portion 112 is movable with respect to the first substrate electrode 106 and the second substrate electrode 206. A second semi-insulator 212 (or second layer 212a comprising the second semi-insulator 212) is positioned so as to separate the second substrate electrode 206 from the flexible electrode layer 108a (e.g., the second semi-insulator 212 is on or above the second substrate electrode 206). In one or more examples, the second semi-insulator 206 has a bulk electrical resistivity greater than $10^7$ Ωcm but less than $10^{13}$ Ωcm.

Third Example Structure (Cooling Device)

Figure 3:
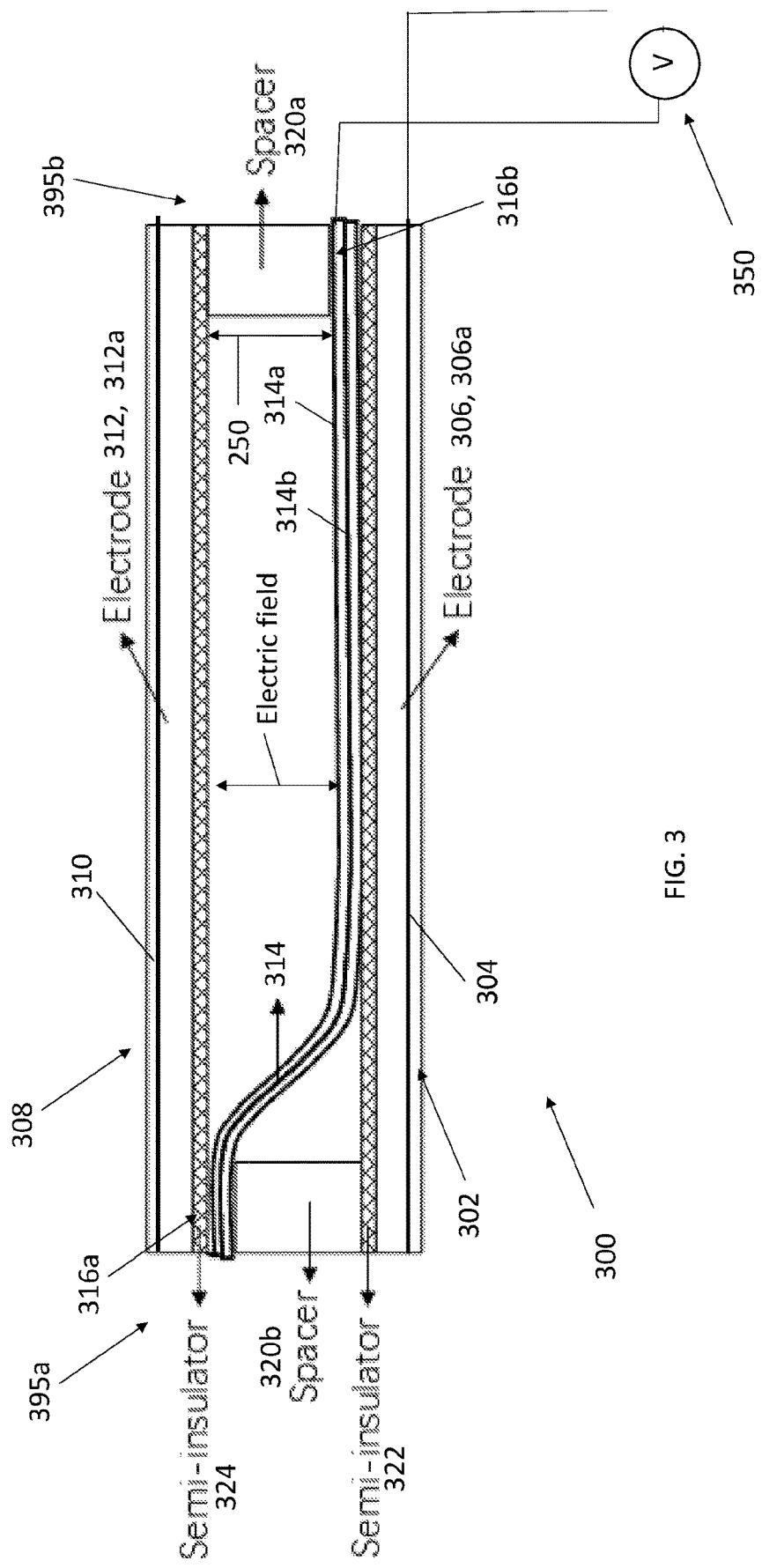
FIG. 3 The cross-sectional view of an alternate embodiment of the invention used as a electrocaloric cooling device.

FIG. 3 illustrates an electrostatically actuated electrocaloric cooling device 300, comprising a first substrate 302 defining or having a smooth surface 304; a first substrate electrode 306 forming a layer, or a layer 306a comprising an electrode 306, on the smooth surface of the first substrate; a second substrate 308 defining or having a smooth surface 310; and a second substrate electrode 312 forming a layer (or a layer 312a comprising an electrode 312) on the smooth surface 310 of the second substrate.

The device further includes a (e.g., two-layer) flexible electrocaloric (e.g., polymer) stack 314 including one or more polymer layers 314b and one or more (e.g., three) flexible electrode layers 314a, fixed portions 316a, 316b attached to an underlying surface of the first substrate and the second substrate, respectively, and a movable portion 318 that is movable with respect to the first substrate electrode and the second substrate electrode.

The first spacer 320a is attached (or part of) the first substrate and the first spacer 320a is between the first substrate electrode 306 and the first fixed portion 316a. The second spacer 320b is attached (or part of) the second substrate electrode 312, and the second spacer 320b is between the second substrate electrode 312 and the second fixed portion 316b.

In one or more examples, the first spacer 320a is attached to a first end 395a of the first substrate 302 and to the first fixed portion 110 at the first end of the stack 314, so that the first fixed portion is fixed between the first spacer 320a and the second substrate electrode (e.g., so that the movable portion 112 can pivot about the first fixed portion when an electric field is applied between the stack and the first substrate electrode and/or the second substrate electrode). A second spacer 320b is attached to a second end 395 of the second substrate 308 and to the second fixed portion 208 at the second end of the stack 314, so that the second fixed portion is fixed between the second spacer 320b and the first substrate electrode (e.g., so that the movable portion can pivot about the second fixed portion when an electric field (E-field) is applied between the stack and the first substrate electrode and/or the second substrate electrode).

The stack overlays the first substrate electrode or the second substrate electrode depending on voltages/electric fields applied to the electrodes. In one or more examples, according to the circuit design, the number of polymer film layers 314b in the stack 314 must be even and the number of electrode layers 314a in the stack 314 must be odd. In one experiment and embodiment, a 2-layer stack and 3 electrodes are the optimized configuration considering the stiffness of stack.

The device further includes a first semi-insulator 322 (or first semi-insulator layer 322a or layer 322a comprising the first semi-insulator) separating the first substrate electrode from the stack (e.g., the first semi-insulator is on or above first substrate electrode) and having a bulk electrical resistivity greater than $10^7$ Ωcm but less than $10^{13}$ Ωcm. The device further includes a second semi-insulator 324 (or second semi-insulator layer 324b or layer 324b comprising the second semi-insulator) separating the second substrate electrode from the stack (e.g., the second semi-insulator is on or above the second substrate electrode) and having a bulk electrical resistivity greater than $10^7$ Ωcm but less than $10^{13}$ Ωcm.

In one or more embodiments, the electrostatically actuated electrocaloric cooling device further includes a voltage source 350 for applying a voltage differential V. In one or more examples, the application of a voltage differential between the flexible electrode layers and the first substrate electrode or the second substrate electrode creates an electrostatic force moving the medial portion (or movable portion) of the flexible stack to attach the first substrate or the second substrate (or to the first substrate electrode or the second substrate electrode). In one or more further examples, the application of a voltage differential on said flexible electrocaloric polymer stack creates a temperature difference absorbing heat from said first substrate and transferring the heat to said second substrate.

In various embodiments, when a voltage is applied between the stack and the electrode layer (e.g., first substrate electrode) on the bottom substrate (e.g., first substrate), the stack is induced by electrostatic force to deflect in a rolling wave-like motion. While the voltage applied between the stack and bottom electrode (e.g., first electrode layer) is turned off, the present disclosure has surprisingly and unexpectedly found that static charges on the semi-insulator layer can move away quickly due to the proper electrical conductivity of the semi-insulator layer. Then the device can be actively opened and move to the top semi-insulator layer (e.g., second semi-insulator layer 324*a*) when a voltage is applied between the stack and the electrode layer (e.g., second substrate electrode) on the top substrate (e.g., second substrate).

Experimental Results

TABLE 1

The relationship between the resistivity of semi-insulator and operation frequency of flexible membrane.

| Resistivity of Semi-insulator (Ω cm) | Operation frequency (Hz) |
|---|---|
| >$10^{13}$ | No response |
| $10^9$-$10^{13}$ | <0.5 |
| $10^7$-$10^9$ | ≤1 |
| <$10^7$ | Easy to break down |

Table 1 shows that the high operation frequency can be realized using a semi-insulator which has a bulk electrical resistivity greater than $10^7$ Ωcm but less than $10^9$ Ωcm. This resistivity range is semi-insulating such that electrostatic force can be formed when a voltage bias is applied on the underlying electrode, while the resistivity is finite to allow the charges to be dissipated when the voltage is removed. The observed operation frequency is dependent on thickness of the semi-insulating layer, and frequency greater than 1 Hz is anticipated when the parameters are articulated.

Figure 4:
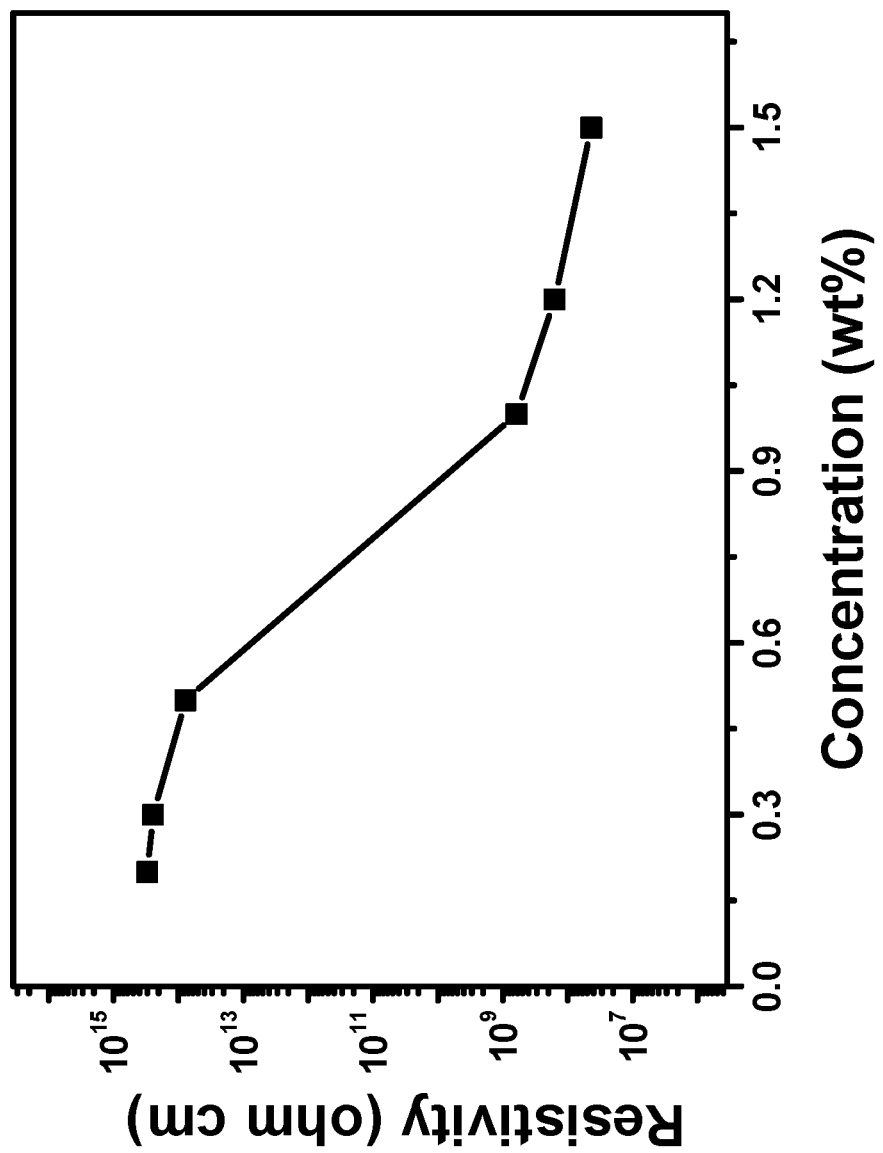
FIG. 4. Resistivity of semi-insulator as a function of concentration of conductive filler in the polymer matrix.

FIG. 4 shows the resistivity of semi-insulator as a function of concentration of conductive filler in the polymer matrix of the semi-insulator. In various examples, the semi-insulator is a polymer-conductor composite (e.g., a composite including a polymer combined with a conductor) comprising at least one polymer comprising/selected from polyimide, polyurethane, polyvinylidene fluoride and/or polydimethylsiloxane and the conductive filler comprises at least one conductor selected from/comprising graphite powder, one or more carbon nanotubes, graphene, one or more nano metal wires (e.g., wires comprising or consisting essentially of metal and/or having a diameter and/or length in a range of 1-100 nanometers), or one or more conductive polymers.

Possible Modifications and Variations a. Structural Examples

In the various embodiments, the movable portion defines a generally constant air gap between the second substrate electrode and the flexible membrane.

In various embodiments, the movable portion defines a generally decreasing air gap between the first substrate electrode and the flexible membrane.

In various embodiments, the movable portion defines a generally decreasing air gap between the second substrate electrode and the flexible membrane electrode.

In various embodiments, the flexible membrane defines a contact zone where an air gap decreases to zero at a location between the first substrate and the flexible membrane.

In various embodiments, the flexible membrane defines a contact zone where an air gap decreases to zero at a location between the second substrate and the flexible membrane.

In various embodiments, an air gap between the flexible membrane and the first substrate or the second substrate generally maintains shape with or without the generation of an electrostatic force between the flexible electrode layer and the first substrate electrode or the second substrate electrode.

In various embodiments, the first substrate electrode and the second substrate electrodes underlie substantially an entire area of the movable portion of the flexible membrane.

In various embodiments, the first semi-insulator and the second semi-insulator are attached to, and overlie, the first substrate electrode and the second substrate electrode layer.

In various embodiments, the surface areas of the first substrate electrode and the second substrate electrodes each comprise generally the same surface area as the flexible electrode layer.

In various embodiments, the shape of the first substrate electrode and the second substrate electrode is generally the same as the shape of the flexible electrode layer.

In various embodiments, the flexible membrane has a generally rectangular shape.

In various embodiments, the first and second semi-insulators have or are layers having a thickness of 1-100 micrometers (µm) or 2-100 µm.

In various embodiments, the flexible membrane is a heat transporting element transferring heat between the first substrate and the second substrate.

In various embodiments, the devices of the first example and the second example are electro-thermally responsive devices, where the flexible membrane transduces between electrical energy and heat energy (e.g., the device converts electrical energy to heat energy and/or the device converts heat energy to electrical energy).

In various embodiments of the first and second examples, the flexible membrane is an electromechanically responsive membrane comprising an even number of stacked electromechanically responsive layers and the flexible electrode layer between adjacent electromechanically responsive layers.

In various embodiments, the electrostatically actuated electrocaloric cooling device includes the flexible electrocaloric polymer stack having a thickness of 10-100 µm or 1-50 µm.

b. Materials Examples

In various examples, the first semi-insulator and/or second semi-insulator each independently comprise a dielectric layer such as, but not limited to, an antistatic material or coating. References [1]-[3] describe examples of antistatic coatings. In general, antistatic materials contains a base polymer and an antistatic additive to form a conductive matrix. Antistatic agents make the surface of a material slightly conductive, either by being conductive itself, or by absorbing moisture from the air. The additives can be one or more metal particles, one or more carbon nanotubes, graphene, carbon powder, carbon fiber or conductive polymer, while the polymer can be acrylonitrile butadiene styrene (ABS), Acetal, polycarbonate (PC), polypropylene (PP), PVDF, Polyethylene terephthalate (PET), polyurethane(PU) or UHMW-PE. (1-5), for example.

Example dielectric layers include static dissipative polymer blends specifically designed for medical devices and equipment (e.g., as fabricated by Foster Corporation see http://www.fostercomp.com). These blends use a non-migratory, polyether block amide (PEBA) polymer additive that retains continuous antistatic properties and cannot be wiped off with medical cleaning agents. This unique polymer additive can be compounded into other polymers with compatible melting temperatures, including thermoplastic PU, ABS, PP, polyethylene (PE), polymethyl-methacrylate (PMMA), and polyvinyl chloride (PVC).

In various embodiments, the first semi-insulator and the second semi-insulator comprise a major portion of a polymer (for example polyimide, polyurethane, polyacrylate, polyvinylidene fluoride and polydimethylsiloxane) providing mechanical, electrical and other support. In one or more examples, the conductivity of semi-insulators which comprise the conductive fillers and polymer is between the conductivity of a semiconductor and the conductivity of an insulator, so the polymer as a matrix is the major portion with the mass fraction from 0.985 to 0.996 and the conductive fillers are the minor portion with the mass fraction from 0.006 to 0.015.

In various embodiments, the first and second semi-insulators comprise the minor portion of a conductive component (for example, graphite powder, carbon nanotube, graphene, metal nanowire, metal nanoparticle, and conductive polymer, and so on) acting as a channel for residual charge dissipation. In one or more embodiments, the conductivity of semi-insulators which comprise the conductive fillers and polymer is between semiconductor and insulator, so the polymer as a matrix is the major portion with the mass fraction from 0.985 to 0.996 and the conductive fillers are the minor portion with the mass fraction from 0.006 to 0.015.

In various embodiments, the first semi-insulator and the second semi-insulator have proper bulk electrical resistivity.

In various embodiments, the electrodes of the flexible electrocaloric polymer stack comprise one or more carbon nanotube(s), one or more silver nanowire(s), one or more copper nanowire(s), conducting polymer(s), or a layer of metal.

c. Device Embodiments

FIGS. 1-4 illustrate example actuator devices. The device can be embodied in many ways including, but not limited to, the following.

1. An actuator device (100, 200) driven by one or more electrostatic forces
  (e.g., electric field(s)), comprising:
  a substrate (102) having a (e.g., smooth) surface (104);
  a substrate electrode (306) forming a layer (116a, 306a) on the (e.g., smooth) surface (104);
  a flexible membrane (108) overlaying the substrate electrode (306), the flexible membrane (108) including:
    a flexible electrode layer (108b),
    a fixed portion (110) attached to an underlying surface (150) of the substrate (102), and
    a movable portion (112, 318) that is movable with respect to the substrate electrode (306); and
  a semi-insulator (116) separating the substrate electrode (306) from the flexible electrode layer (108b) and having a bulk electrical resistivity greater than $10^7$ Ωcm but less than $10^{13}$ Ωcm.

2. The actuator device (100, 200) according to embodiment 1, further comprising:
  a second substrate (202, 308) having a second (e.g., smooth) surface (204);
  a second substrate electrode (312) forming a second layer (212a) on the second (e.g., smooth) surface (304, 310);
  the flexible membrane (108) overlaying the substrate electrode (e.g., first substrate electrode 306) or the second substrate electrode (312) depending on a voltage differential (V) applied between the second substrate electrode (312), the substrate electrode (306), and the flexible electrode layer (108b), the flexible membrane (108) further comprising:
    a second fixed portion (208, 316b) attached to a second underlying surface of the second substrate (202, 308), and
    the movable portion (112, 318) that is movable with respect to the substrate electrode (e.g., first substrate electrode 306) and the second substrate electrode (312); and
  a second semi-insulator (324) separating the second substrate electrode (312) from the flexible electrode layer (108b), the second semi-insulator having a bulk electrical resistivity greater than $10^7$ Ωcm but less than $10^{13}$ Ωcm.

3. The actuator device (100, 200) according to embodiment 1, wherein the movable portion (112, 318) defines a first generally constant air gap (152) between the substrate electrode (e.g., first substrate electrode 306) and the flexible membrane (108).

4. The actuator device (100, 200) according to embodiment 2, wherein the movable portion (112, 318) defines a second generally constant air gap (250) between the second substrate electrode (306, 312) and the flexible electrode layer (108b).

5. The actuator device (100, 200) according to embodiment 1, wherein the movable portion (112, 318) defines a generally decreasing air gap (152) between the first substrate electrode (306) and the flexible electrode layer (108b).

6. The actuator device (100, 200) according to embodiment 2, wherein the movable portion (112, 318) defines a generally decreasing air gap (250) between the second substrate electrode (312) and the flexible electrode layer (108b).

7. The actuator device (100, 200) according to embodiment 1, wherein the flexible membrane (108) defines a contact zone (154) where an air gap (152) decreases to zero at a location between the first substrate (102) (302) and the flexible membrane (108).

8. The actuator device (100, 200) according to embodiment 2, wherein the flexible membrane (108) defines a contact zone (154) where an air gap (250) decreases to zero at a location between the second substrate (202, 308) and the flexible membrane (108).

9. The actuator device (100, 200) according to embodiment 2, wherein an air gap (152), (250) between the flexible membrane (108) and the (e.g., first) substrate (102) (302) or the second substrate (202, 308) generally maintains shape with or without a generation of an electrostatic force (e.g., electric field E-field) between the flexible electrode layer (108b) and the (e.g., first) substrate electrode (306) or the second substrate electrode (312).

10. The actuator device (100, 200) according to embodiment 2, wherein the first substrate electrode (306) and the second substrate electrode (312) underlie or overlie substantially an entire area (156) of the movable portion (112, 318) of the flexible membrane (108).

11. The actuator device (100, 200) according to embodiment 2, wherein the (e.g., first) semi-insulator (116) and the second semi-insulator (324) are attached to, and overlie, the first substrate electrode (306) and the second substrate electrode (312), respectively.

12. The actuator device (100, 200) according to embodiment 2, wherein surface areas of the first substrate electrode (306) and the second substrate electrode (312) each comprise generally a same surface area (158) as the flexible electrode (108c).

13. The actuator device (100, 200) according to embodiment 2, wherein a first shape (160) of the (e.g., first) substrate electrode (306) and a second shape (260) of the second substrate electrode (312) are generally the same as a shape (164) of the flexible electrode layer (108*b*).

14. The actuator device (100, 200) according to embodiment 2, wherein the flexible membrane (108) has the shape comprising a generally rectangular shape.

15. The actuator device (100, 200) according to embodiment 2, wherein the flexible membrane (108) is generally curled away from the underlying (e.g., first) substrate (102) (302) or the underlying second substrate (202, 308) when application of the voltage differential (V) generates an electric field E deflecting the flexible membrane (108) in a rolling wave-like motion moving from one of the fixed portions (110, 316*a*) to the other of the fixed portions (208, 316*b*) (e.g., a rolling wave-like motion moving from the fixed portion to the second fixed portion or from the second fixed portion to the fixed portion).

16. The actuator device of embodiment 2, comprising an electro-thermally responsive device, wherein the flexible membrane (108) transduces between electrical energy and heat energy.

17. The electro-thermally responsive device according to embodiment 16, wherein the flexible membrane (108) is an electromechanically responsive membrane comprising an even number of stacked electromechanically responsive layers and the flexible electrode layer (108*b*) between adjacent electromechanically responsive layers.

18. An electrostatically actuated electrocaloric cooling device (300), comprising:

a first substrate defining a (e.g., smooth) surface (104, 304);

a first substrate electrode (306) forming a layer (116*a*, 306*a*, 312*a*) on the (e.g., smooth) surface (104, 304) of the first substrate (102, 302);

a second substrate (202, 308) defining a (e.g., smooth) surface (304, 310);

a second substrate electrode (312) forming a layer (116*a*, 306*a*, 312*a*) on the (e.g., smooth) surface (310) of the second substrate (202, 308);

a (e.g., two-layer) flexible electrocaloric stack (314) including (e.g., three) flexible electrode layers (108*b*) and overlaying the first substrate electrode (306) or the second substrate electrode (312) depending on a voltage differential (V) applied between the first substrate electrode (306), the second substrate electrode (312), and the flexible electrode layer (108*b*), the flexible electrocaloric stack further including:

a first fixed portion (110, 316*a*) attached to an underlying surface of the first substrate (102) (302), a second fixed portion (208, 316*b*) attached to an underlying surface of the second substrate (202, 308), and a movable portion (112, 318) that is movable with respect to the first substrate electrode (306) and the second substrate electrode (312), a first semi-insulator (116) separating the first substrate electrode (306) from the flexible electrocaloric stack and having a bulk electrical resistivity greater than $10^1$ Ωcm but less than $10^{13}$ Ωcm; and a second semi-insulator (234) separating the second substrate electrode (312) from the stack and having a bulk electrical resistivity greater than $10^7$ Ωcm but less than $10^{13}$ Ωcm.

19. The electrostatically actuated electrocaloric cooling device (300) according to embodiment 18, further comprising:

a voltage source (350), wherein an application of a voltage differential between the one or more flexible electrode layers (108*b*) and the first substrate electrode (306) or the second substrate electrode (312) creates an electrostatic force moving the movable portion (112, 318) (comprising a medial portion of the flexible electrocaloric stack) to attach the movable portion (112, 318) to the first substrate (102) (302) or the second substrate (202, 308).

20. The electrostatically actuated electrocaloric cooling device (300) according to embodiment 18, further comprising:

a voltage source (350), wherein an application of a voltage differential on said flexible electrocaloric stack comprising (e.g., a polymer) creates a temperature difference absorbing heat from said first substrate (102) (302) and transferring the heat to said second substrate (202, 308).

21. The electrostatically actuated electrocaloric cooling device (300) according to embodiment 18, wherein said first semi-insulator and said second semi-insulator comprise a major portion of a polymer (for example polyimide, polyurethane, polyacrylate, polyvinylidene fluoride and polydimethylsiloxane) providing mechanical, electrical and other support.

22. The electrostatically actuated electrocaloric cooling device (300) according to embodiment 18, wherein the first semi-insulator (116) and the second semi-insulator (234) comprise a minor portion of a conductive component (for example, graphite powder, carbon nanotube, graphene, metal nanowire, metal nanoparticle, and conductive polymer, and so on) acting as a channel for residual charge dissipation.

23. The electrostatically actuated electrocaloric cooling device (300) according to embodiment 18, wherein said first semi-insulator insulator and said second semi-insulator have proper bulk electrical resistivity.

24. The electrostatically actuated electrocaloric cooling device (300) according to embodiment 18, wherein the first semi-insulator and the second semi-insulator each independently comprise one or more layers having a thickness T of 0.2-100 μm.

25. The electrostatically actuated electrocaloric cooling device (300) according to embodiment 18, wherein the flexible electrocaloric stack has a thickness T2 of 1-50 μm.

26. The electrostatically actuated electrocaloric cooling device (300) according to embodiment 18, wherein the electrodes of the flexible electrocaloric stack comprise carbon nanotube(s), silver nanowire(s), a copper nanowire(s), conducting polymer(s), or a layer (116*a*, 306*a*, 312*a*) of metal.

27. A device, comprising:

a first substrate electrode (306);

a first semi-insulator layer (116*a*, 306*a*) on the first substrate electrode (306) and having a bulk electrical resistivity greater than $10^7$ Ωcm but less than $10^{13}$ Ωcm;

a second substrate electrode (312);

a second semi-insulator layer (312*a*) having a bulk electrical resistivity greater than $10^7$ Ωcm but less than $10^{13}$ Ωcm; and a flexible membrane (108) comprising a flexible electrode (108*c*) moving between a first physical contact with the first semi-insulator layer (116*a*, 306*a*) and a second physical contact with the second semi-insulator layer 324*a*) in response to a voltage differential (V) applied between the flexible electrode (108*c*), the second substrate electrode (312), and the first substrate electrode (306).

28. The device of embodiment 27, wherein the device is an electrocaloric cooling device (300).

29. The device of any of the preceding embodiments, wherein a major portion (e.g. more than 50%) of the first semi-insulator and the second semi-insulator comprises a polymer and a minor portion (e.g., less than 90%) of the first semi-insulator and the second semi-insulator comprises a conductive component acting as a channel for residual charge dissipation.

30. The device of any of the preceding embodiments, wherein the first semi-insulator and the second insulator each include a polymer component (comprising one or more polymers) combined with a conductive component. In one or more examples, the first-semi insulator (or layer comprising the first semi-insulator) and the second semi-insulator (or layer comprising the first semi-insulator) each have a mass and the polymer component comprises a mass fraction of at least 0.5; at least 0.9; at least 0.98, or at least 0.99 (e.g., 0.985 to 0.996) of the mass; and the conductive component comprises a mass fraction of less than 0.5; 0.1 or less; 0.01 or less; or 0.001 or less (e.g., 0.006 to 0.015).

31. The device of embodiment 30, wherein the polymer component or the one or more polymers comprise or are selected from polyimide, polyurethane, polyvinylidene fluoride and/or polydimethylsiloxane and the conductive component comprises at least one conductor selected from/comprising graphite powder, one or more carbon nanotubes, graphene, one or more nano metal wires (e.g., wires comprising or consisting essentially of metal and/or having a diameter and/or length in a range of 1-100 nanometers), or one or more conductive polymers.

d. Process Steps

Figure 5:
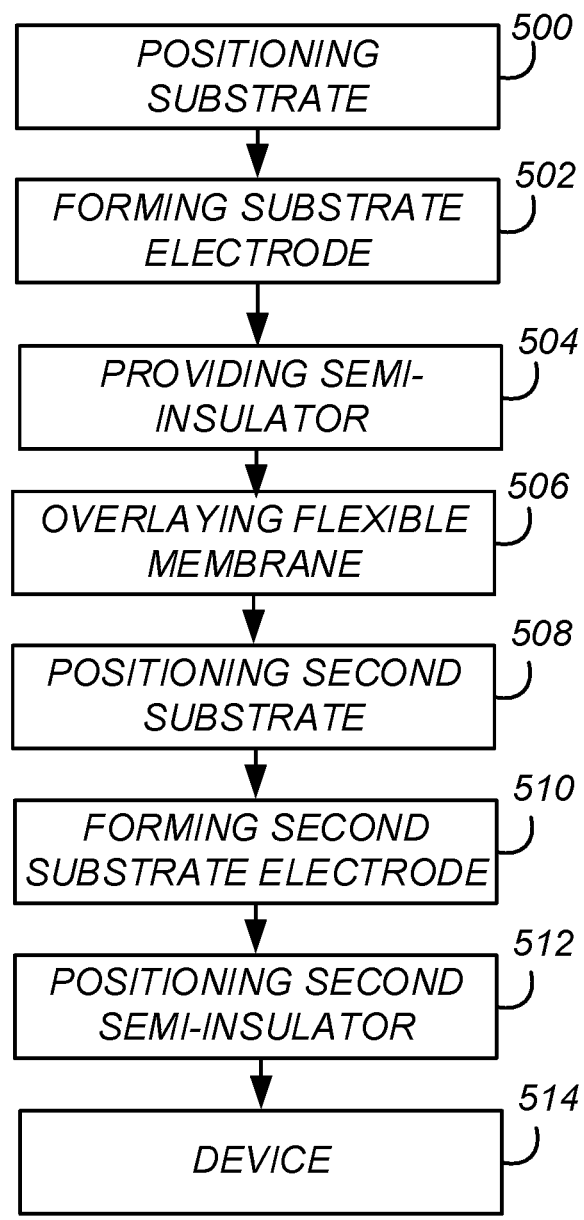
FIG. 5 is a flowchart illustrating a method of making a device.

FIG. 5 illustrates an actuator device driven by electrostatic forces, comprising:

Block 500 represents providing or positioning a substrate having a (e.g., smooth) surface.

Block 502 represents forming a layer comprising a substrate electrode on the smooth surface. In one or more embodiments, the surface of the substrate and/or the surface of the substrate contacting the surface of the substrate each have a smoothness that provides adequate adhesion between the surface of the substrate that if the surface is smooth, stronger adhesion is obtained.

Block 504 represents providing or positioning a semi-insulator and having a bulk electrical resistivity greater than $10^7$ Ωcm but less than $10^3$ Ωcm.

Block 506 represents overlaying a flexible membrane on or above the substrate electrode, the flexible membrane including a flexible electrode layer, a fixed portion attached to an underlying surface of the substrate, and a movable portion that is movable with respect to the substrate electrode; and so that the semi-insulator separates the substrate electrode from the flexible electrode layer.

Block 508 represents optionally providing or positioning a second substrate having a second (e.g., smooth) surface.

Block 510 represents optionally forming a second layer comprising a substrate electrode on or above the second (e.g., smooth) surface.

Block 512 represents optionally positioning a second semi-insulator having a bulk electrical resistivity greater than $10^7$ Ωcm but less than $10^{13}$ Ωcm; so that the flexible membrane overlays the first substrate electrode or the second substrate electrode depending on a voltage differential applied between the second substrate electrode, the first substrate electrode, and the flexible electrode layer, the flexible membrane further comprising a second fixed portion attached to a second underlying surface of the second substrate, and the movable portion that is movable with respect to the first electrode and the second substrate electrode; and the second semi-insulator separates the second substrate electrode from the flexible electrode layer.

Block 514 represents the end result, a device. Examples devices include, but are not limited to, the device embodiments 1-31 in section b above.

Advantages and Improvements

An electrostatically actuated device has relatively low fabrication costs, and consumes relatively low power. It is suitable for a wide variety of applications, including but not limited to, low power and compact solid-state cooling device applications. In an embodiment of the invention, the device comprises a bottom electrode on a substrate and a top electrode on a substrate separated by a fixed distance from each other. Semi-insulator layers with proper electrical conductivity are attached to the bottom and top electrodes. Disposed between the substrates is a flexible S-shaped polymer stack having electrode layers with one end of the stack attached to the top substrate and the other end in contact with the bottom substrate. When a voltage is applied between the stack and the electrode layer on the bottom substrate, the stack is induced by electrostatic force to deflect in a rolling wave-like motion. While the voltage applied between the stack and bottom electrode is turned off, the static charges on the semi-insulator layer can move away quickly due to the proper electrical conductivity of the semi-insulator layer. Then the device can be actively opened and move to the top semi-insulator layer when a voltage is applied between the stack and the electrode layer on the top substrate.

REFERENCES

The following references are incorporated by reference herein.

[1] Comparison of the Properties of Waterborne Polyurethane/Multiwalled Carbon Nanotube and Acid-Treated Multiwalled Carbon Nanotube Composites Prepared by In Situ Polymerization, by Jiyun Kwon and Hando Kim, DOI: 10.1002/pola.20897 Published online in Wiley InterScience (www.interscience.wiley.com).

[2] Effects of antistatic agent on the mechanical, morphological and antistatic properties of polypropylene/organomontmorillonite nanocomposites, by W. S. Chow and W. L. Tham, eXPRESS Polymer Letters Vol. 3, No. 2 (2009) 116-125 Available online at www.expresspolymlett.com DOI: 10.3144/expresspolymlett.2009.15

[3] Microstructure of carbon nanotubes, PET conductive composites fibers and their properties Zhifei Li, Guohua Luo, Fei Wei, Yi Huang, Composites Science and Technology 66 (2006) 1022-1029.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An actuator device driven by electrostatic forces, comprising:
   a substrate having a smooth surface;
   a substrate electrode forming a layer on the smooth surface;
   a flexible membrane overlaying the substrate electrode, the flexible membrane including:
      a flexible electrode layer,
      a fixed portion attached to an underlying surface of the substrate, and
      a movable portion that is movable with respect to the substrate electrode; and
   a semi-insulator separating the substrate electrode from the flexible electrode layer and having a bulk electrical resistivity greater than $10^7$ Ωcm but less than $10^{13}$ Ωcm.

2. The actuator device according to claim 1, further comprising:
   a second substrate having a second smooth surface;
   a second substrate electrode forming a second layer on the second smooth surface;
   the flexible membrane overlaying the substrate electrode or the second substrate electrode depending on a voltage differential applied between the second substrate electrode, the substrate electrode, and the flexible electrode layer, the flexible membrane further comprising:
      a second fixed portion attached to a second underlying surface of the second substrate, and
      the movable portion that is movable with respect to the substrate electrode and the second substrate electrode; and
   a second semi-insulator separating the second substrate electrode from the flexible electrode layer, the second semi-insulator having a bulk electrical resistivity greater than $10^7$ Ωcm but less than $10^{13}$ Ωcm; and
   wherein the smooth surfaces are sufficiently smooth to allow adhesion between the smooth surfaces that are in contact.

3. The actuator device according to claim 1, wherein the movable portion defines a generally constant air gap between the substrate electrode and the flexible membrane.

4. The actuator device according to claim 2, wherein the movable portion defines a generally constant air gap between the second substrate electrode and the flexible electrode layer.

5. The actuator device according to claim 2, wherein the movable portion defines a generally decreasing air gap between the second substrate electrode and the flexible electrode layer.

6. The actuator device according to claim 2, wherein the flexible membrane defines a contact zone where an air gap decreases to zero at a location between the second substrate and the flexible membrane.

7. The actuator device according to claim 2, wherein an air gap between the flexible membrane and the substrate or the second substrate generally maintains shape with or without a generation of an electrostatic force between the flexible electrode layer and the substrate electrode or the second substrate electrode.

8. The actuator device according to claim 2, wherein the substrate electrode and the second substrate electrode underlie or overlie substantially an entire area of the movable portion of the flexible membrane.

9. The actuator device according to claim 2, wherein the semi-insulator and the second semi-insulator are attached to, and overlie, the substrate electrode and the second substrate electrode, respectively.

10. The actuator device according to claim 2, wherein surface areas of the substrate electrode and the second substrate electrode each comprise generally a same surface area as the flexible electrode layer.

11. The actuator device according to claim 2, wherein a first shape of the substrate electrode and a second shape of the second substrate electrode are generally the same as a shape of the flexible electrode layer.

12. The actuator device according to claim 2, wherein the flexible membrane has a generally rectangular shape.

13. The actuator device according to claim 2, wherein the flexible membrane is generally curled away from the underlying substrate or the underlying second substrate when application of the voltage differential generates an electric field deflecting the flexible membrane in a rolling wave-like motion moving from the fixed portion to the second fixed portion or from the second fixed portion to the fixed portion.

14. The actuator device according to claim 2, comprising an electro-thermally responsive device, wherein the flexible membrane transduces between electrical energy and heat energy.

15. The actuator device according to claim 14, wherein the flexible membrane is an electromechanically responsive membrane comprising an even number of stacked electromechanically responsive layers and the flexible electrode layer between adjacent electromechanically responsive layers.

16. The actuator device according to claim 1, wherein the movable portion defines a generally decreasing air gap between the substrate electrode and the flexible electrode layer.

17. The actuator device according to claim 1, wherein the flexible membrane defines a contact zone where an air gap decreases to zero at a location between the substrate and the flexible membrane.

18. An electrostatically actuated electrocaloric cooling device, comprising:
   a first substrate defining a smooth surface;
   a first substrate electrode forming a layer on the smooth surface of the first substrate;
   a second substrate defining a smooth surface;
   a second substrate electrode forming a layer on the smooth surface of the second substrate;
   a flexible electrocaloric stack including two layers comprising polymers and three flexible electrode layers, the flexible electrocaloric stack overlaying the first substrate electrode or the second substrate electrode depending on a voltage differential applied between the first substrate electrode, the second substrate electrode, and the flexible electrode layer, the flexible electrocaloric stack further including:
      a first fixed portion attached to an underlying surface of the first substrate,
      a second fixed portion attached to an underlying surface of the second substrate, and
      a movable portion that is movable with respect to the first substrate electrode and the second substrate electrode,
   a first semi-insulator separating the first substrate electrode from the flexible electrocaloric stack and having a bulk electrical resistivity greater than $10^7$ Ωcm but less than $10^{13}$ Ωcm; and a second semi-insulator separating the second substrate electrode from the flexible electrocaloric stack and having a bulk electrical resistivity greater than $10^7$ Ωcm but less than $10^{13}$ Ωcm; and a voltage source, wherein an application of a voltage differential between the flexible electrode layer and the first substrate electrode or the second substrate electrode creates an electrostatic force moving the movable portion to attach the movable portion to the first substrate or the second substrate; and wherein:

an application of a voltage differential on said flexible electrocaloric stack creates a temperature difference absorbing heat from said first substrate and transferring the heat to said second substrate, and a major portion of the first semi-insulator and the second semi-insulator comprises a polymer.

19. The device of claim 18, wherein:

the polymer comprises polyimide, polyurethane, polyacrylate, polyvinylidene fluoride or polydimethylsiloxane and a conductive component comprising graphite powder, one or more carbon nanotubes, graphene, one or more metal nanowires, one or more metal nanoparticles, or a conductive polymer, the electrodes of the flexible electrocaloric stack comprise one or more carbon nanotubes, one or more silver nanowires, one or more copper nanowires, one or more conducting polymers, or a layer of metal, the first semi-insulator and the second semi-insulator each independently comprise a layer having a thickness of 0.2-100 μm, the flexible electrocaloric stack has a thickness of 1-50 μm, and the smooth surfaces are sufficiently smooth to allow adhesion between the smooth surfaces that are in contact.

20. An electrocaloric cooling device, comprising:

a first substrate electrode;

a first semi-insulator layer on the first substrate electrode and having a bulk electrical resistivity greater than $10^7$ Ωcm but less than $10^{13}$ Ωcm;

a second substrate electrode;

a second semi-insulator layer having a bulk electrical resistivity greater than $10^7$ Ωcm but less than $10^{13}$ Ωcm but less than $10^{13}$ Ωcm; and a flexible membrane comprising a flexible electrode moving between a first physical contact with the first semi-insulator layer and a second physical contact with the second semi-insulator layer in response to a voltage differential applied between the flexible electrode, the second substrate electrode, and the first substrate electrode.

* * * * *